(No Model.) 5 Sheets—Sheet 1.

C. M. SPENCER.
SCREW MACHINE.

No. 447,017. Patented Feb. 24, 1891.

Witnesses.
John Edwards Jr.
W. H. Whiting

Inventor.
Christopher M. Spencer,
By James Shepard
Atty.

(No Model.)　　　　　　　C. M. SPENCER.　　　5 Sheets—Sheet 2.
SCREW MACHINE.

No. 447,017.　　　　　　　　　　Patented Feb. 24, 1891.

Witnesses,
John Edwards Jr.
H. H. Whiting.

Inventor,
Christopher M. Spencer.
By James Shepard
Atty.

(No Model.) 5 Sheets—Sheet 3.
C. M. SPENCER.
SCREW MACHINE.
No. 447,017. Patented Feb. 24, 1891.
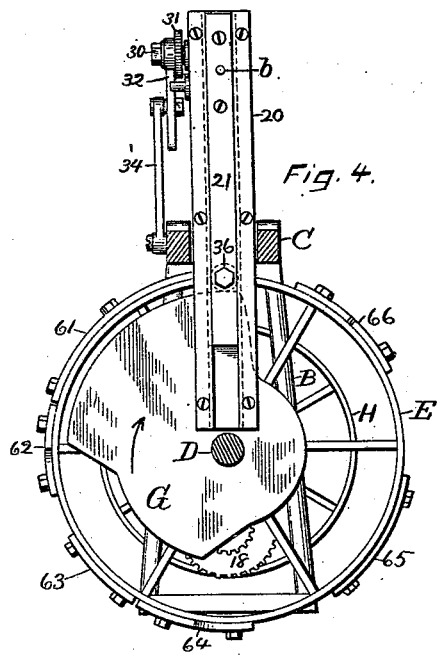
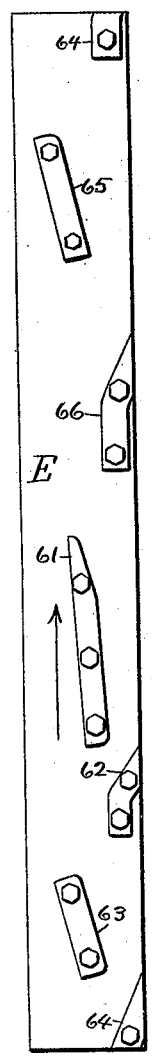
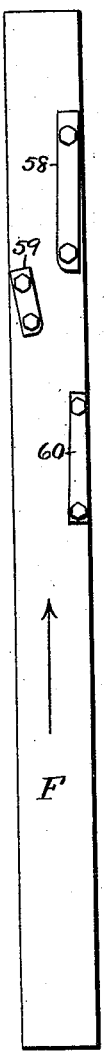
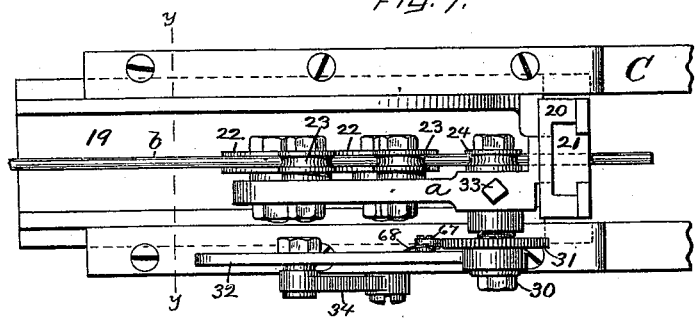
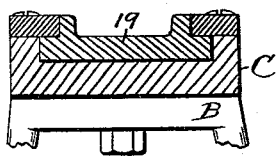
Witnesses,
John Edwards Jr.
W. H. Whiting
Inventor,
Christopher M. Spencer
By James Shepard
Atty.

(No Model.) 5 Sheets—Sheet 4.
C. M. SPENCER.
SCREW MACHINE.
No. 447,017. Patented Feb. 24, 1891.
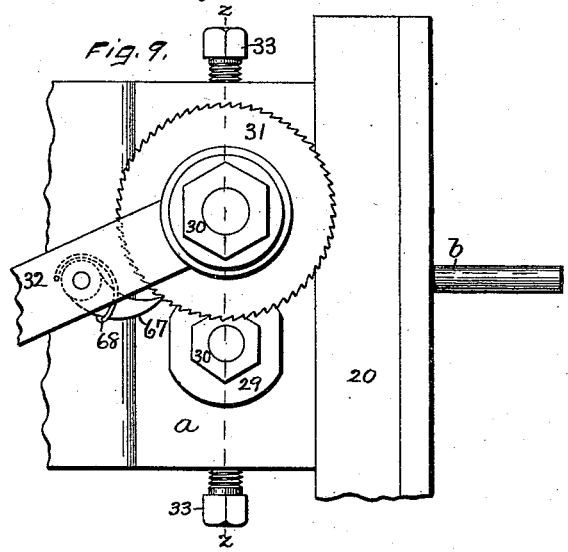
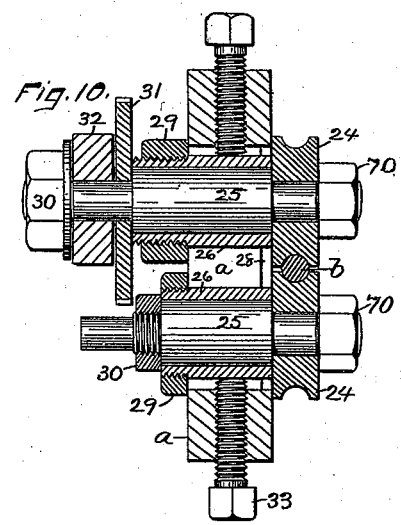
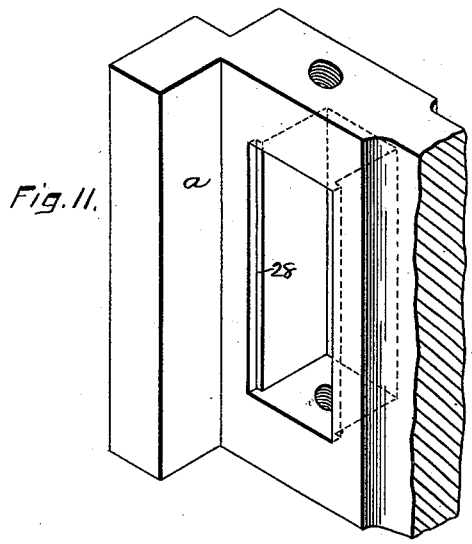
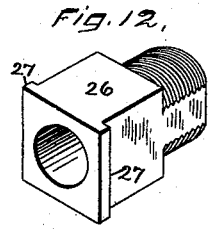
Witnesses:
John Edwards Jr.
W. H. Whiting
Inventor.
Christopher M. Spencer.
By James Shepard
Atty.

(No Model.)   C. M. SPENCER.   5 Sheets—Sheet 5.
SCREW MACHINE.
No. 447,017.   Patented Feb. 24, 1891.
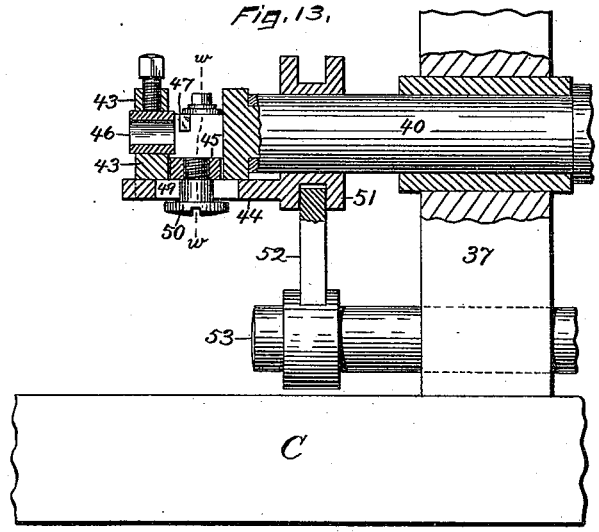
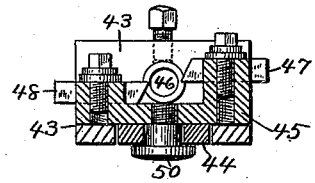
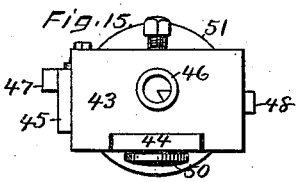
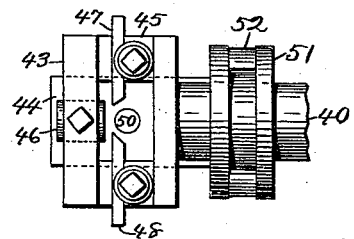
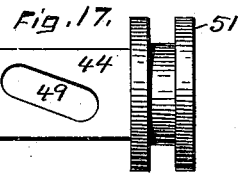
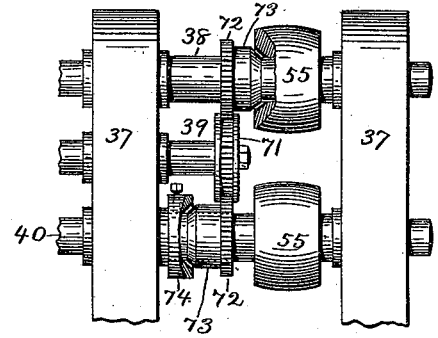
Witnesses.
John Edwards Jr.
W. H. Whiting
Inventor.
Christopher M. Spencer,
By James Shepard
Atty.

UNITED STATES PATENT OFFICE.

CHRISTOPHER M. SPENCER, OF WINDSOR, ASSIGNOR OF ONE-HALF TO ARTHUR H. EDDY, OF HARTFORD, CONNECTICUT.

SCREW-MACHINE.

SPECIFICATION forming part of Letters Patent No. 447,017, dated February 24, 1891.

Application filed September 26, 1890. Serial No. 366,183. (No model.)

*To all whom it may concern:*

Be it known that I, CHRISTOPHER M. SPENCER, a citizen of the United States, residing at Windsor, in the county of Hartford and State of Connecticut, have invented certain new and useful Improvements in Screw-Machines, of which the following is a specification.

My invention relates to improvements in machines for making screws automatically; and the objects of my improvement are to make screws directly from a coil of wire, to simplify the construction of the machine, and to increase its efficiency, especially with reference to requiring but little attention from an attendant, and to rapidity of producing screws.

Figure 1:
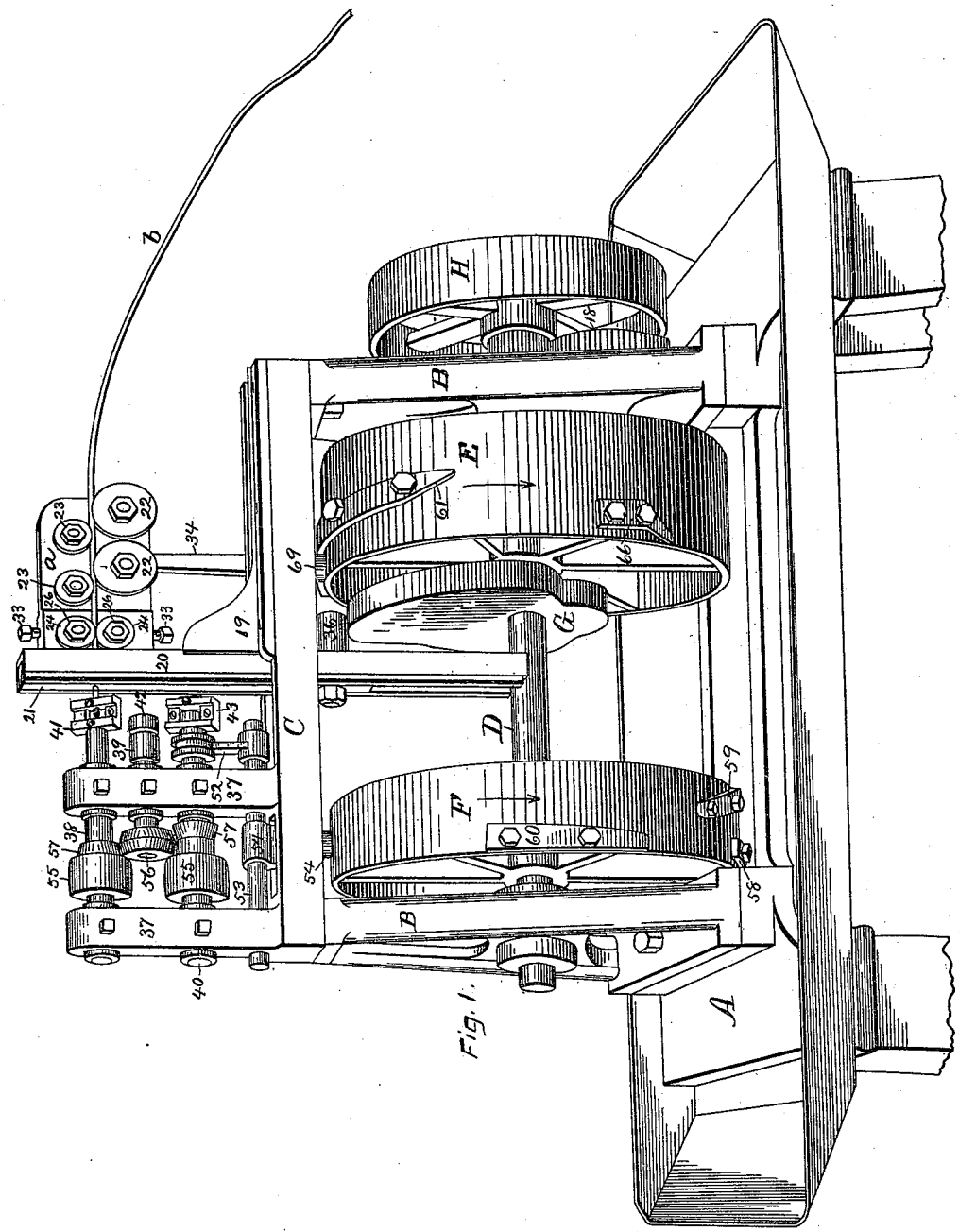
Figure 2:
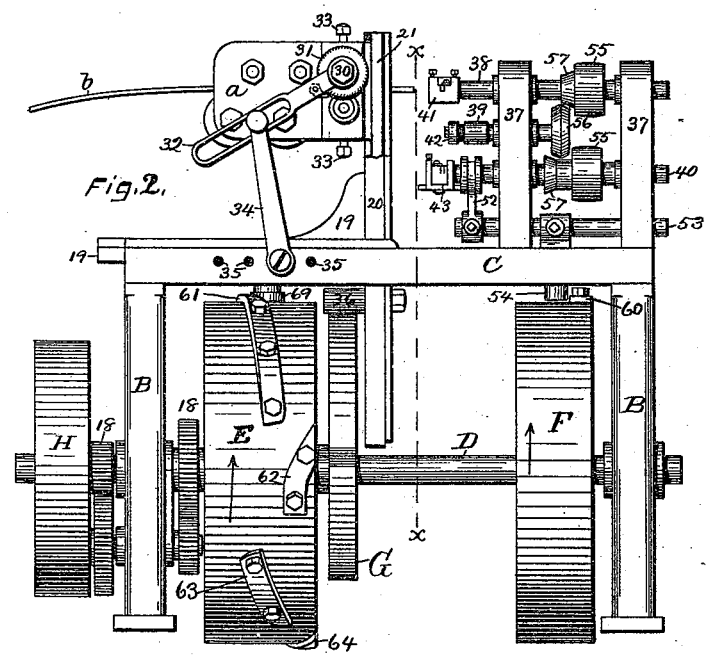
Figure 3:
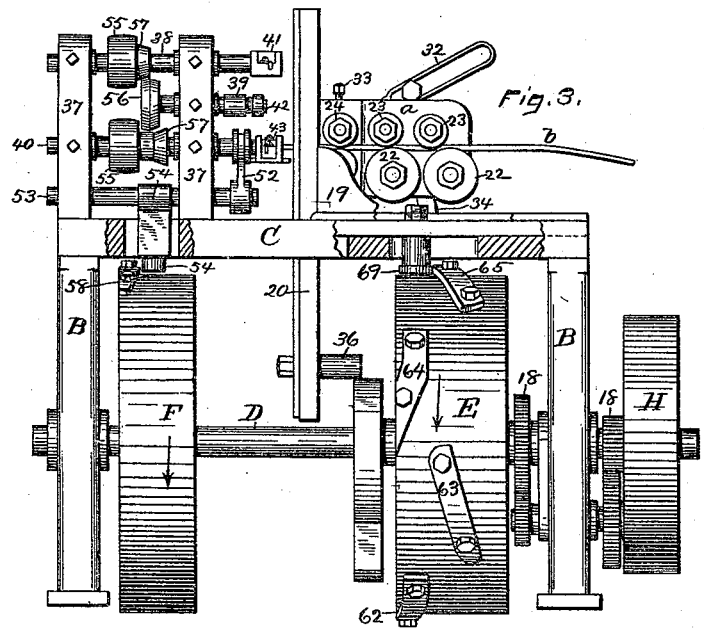

In the accompanying drawings, Figure 1 is a perspective view of my machine. Fig. 2 is a front elevation of the same. Fig. 3 is a rear elevation thereof with parts of the bed sectioned and broken away. Fig. 4 is a vertical section of the bed and shaft on line $x\ x$ of Fig. 2, the parts on the left of said line being shown in side elevation. Figs. 5 and 6 are developed plan views of two cam-wheels. Fig. 7 is an enlarged plan view of one end of the machine. Fig. 8 is a vertical section on line $y\ y$ of Fig. 7. Fig. 9 is a detached front elevation showing a portion of the feed, the same being on a still larger scale. Fig. 10 is a vertical section on line $z\ z$ of Fig. 9. Fig. 11 is a perspective view of supplementary carriage. Fig. 12 is a perspective view of one of the boxes or bearings for the shafts of the feed-rollers. Fig. 13 is a partial central vertical section and partial elevation illustrating more particularly the head of the lower lathe-spindle and its connections. Fig. 14 is a transverse vertical section of said head on the line $w\ w$ of Fig. 13. Fig. 15 is an end view of the same with the tool-carriage moved into a different position. Fig. 16 is a plan view of said head with the tool-carriage in the same position as in Fig. 14. Fig. 17 is a detached plan view of a portion of said head; and Fig. 18 is a front elevation with parts broken away of portions of the lathe-spindles in a modified form, said figure being on the same scale as Figs. 7 and 8.

A designates the bed or table, upon which the uprights B B, that support the second bed C, are mounted. In suitable bearings in the uprights B B the cam-shaft D is supported, said shaft bearing cam-wheels E F and cam G. The shaft is driven by means of the pulley H and connecting back-gearing 18, the same as that on an ordinary engine-lathe, which is too well known to be described.

One end of the bed C (the left-hand end in Fig. 2) is provided with ways, within which the principal carriage 19 reciprocates from right to left. A friction-roller 69 is mounted on a stud on the lower side of said carriage for being engaged by the cams of the cam-wheel E. The inner end of said principal carriage has rigidly connected to it an upright 20, the same being provided with vertical ways, (shown most clearly in plan view, Fig. 7,) within which ways is a vertical slide 21, having a pin 36, that rests upon the edge of the cam G. A supplementary carriage $a$ is rigidly connected to said slide, so that it has an up-and-down movement independent of the principal carriage, while at the same time it moves horizontally with said carriage. To the rear side of the supplementary carriage I attach straightening-rollers 22 23, the same being grooved at their periphery and mounted on suitable shafts, with the axis of the upper rollers in different vertical planes from that of the lower ones, the rollers being set near enough to each other so that a wire $b$, passing between them, will be straightened. Different sizes of rollers may be applied for different sizes of wire. By the side of these straightening-rollers the feed-rollers 24 are mounted. These rollers are mounted on suitable shafts 25 and held upon the shafts by nuts 70. The shafts are received in boxes or bearings 26, which have ledges or flanges 27 at one end for sliding in the vertical ways 28, Figs. 10 and 11, of the supplementary carriage $a$. These boxes are secured within their carriage by nuts 29, while the shafts are secured within their boxes by nuts 30. The shaft for the upper roller has rigidly secured to it a ratchet-wheel 31 and loosely secured, so as to oscillate thereon, a lever 32. This lever has mounted upon it a pawl 67 for engaging the ratchet-wheel 31 and a spring 68 (see Fig. 9) for pressing the pawl against said wheel, all of any ordinary construction. The supplementary carriage $a$ is provided with set-screws 33 for bearing upon the boxes 26 and adjusting the feed-rollers toward each other and holding them in place when adjusted, the nuts 29 being loosened prior to adjustment and retightened after adjustment. The outer end of the lever 32 is or may be slotted longitudinally for purposes of adjustment, and within said slot the upper end of the link 34 is secured, while its lower end is pivotally connected to the bed C. The connection of the upper end of the link with the lever 32, when adjustable therein, may be that of the ordinary slot-and-bolt connection—too common in all classes of machinery to require a detailed description. If desired, the bed C may be provided with several screw-holes, as shown at 35 in Fig. 2, for pivotally connecting the lower end of this link at different points. The opposite end of the bed C is provided with uprights 37, which may be cast integral with said bed. Within these uprights there is a series of spindles 38, 39, and 40, the same bearing at their inner ends any desired tool. As shown, the upper one is provided with a cutter-head 41 for carrying turning-tools for turning down the body of the screw. The middle spindle 39 is provided with a head 42, carrying a threading-die, and the lower spindle 40 with a head 43, that carries a tool for turning off the head of the screw and another for cutting the screw from the wire or stock. The heads 41 and 42 are or may be of any ordinary construction, and hence require no detailed description. In some cases the lower spindle 40 may be provided with a head and cutting-tool of ordinary construction; but when it is provided with a head having a tool for turning the screw-head and another for cutting off the stock it is made as follows: The head 43 is best illustrated in Figs. 13 to 17. It is slotted longitudinally on its under side for the reception of the sliding cam 44, as shown most clearly in Fig. 15, and it is slotted transversely on its upper side to receive the sliding tool-carriage 45. Said sliding tool-carriage is provided with a cutting-tool 47 on the upper side of its center and at its opposite end with a cutting-off tool 48 on the reverse side of its center. The sliding cam 44 is provided with an oblique slot 49, whose edges form the cams, and through which slot a screw 50 passes into the body of the sliding tool-carriage 45. This sliding cam is provided with a grooved collar 51, which encircles the spindle 40, and a shipping-fork 52 is secured to the sliding shaft 53, mounted to slide in the uprights 37, said shaft being provided with a downward projection 54 for engaging the cams of the cam-pulley F. Said head is also provided with a central bushing or socket 46 to support the work therein.

The spindles 38 and 40 are intended to be driven by means of suitable belts running over the pulleys 55, and the spindle 39, which has a slight longitudinal motion in its bearings, is driven by means of the double-faced friction-pulley 56, which bears against opposing conical pulleys 57 on the shafts 38 and 40 in a manner hereinafter described.

The cam-wheel F is provided with cams 58, 59, and 60 for operating the shipper of the sliding tool-carriage, and the cam-wheel E is provided with cams 61, 62, 63, 64, 65, and 66 for reciprocating the carriage 19. I prefer to form these cams of separate pieces screwed to the periphery of the pulleys, so that different cams may be applied to the same pulley for different purposes when desired.

The machine is supplied with wire $b$ from a suitable coil arranged near the machine, so that the wire may be drawn therefrom as it passes between the straightening and feeding rollers. If the coil is set up edgewise, the slight bend in the wire as it is uncoiled will be straightened between the straightening-rollers by pressure upon opposite sides in the bottom of the grooves therein. The feeding and straightening rollers bear upon the stock or wire with sufficient friction to hold the same against rotation during the several operations performed thereon. The cam G, acting on the pin 36 of the slide 21, raises and lowers said slide, together with the supplementary carriage $a$. When this carriage is being lowered, the link 34 pushes the outer end of the lever 32 upwardly and carries its pawl 67 upward, the spring 68 permitting said pawl to yield and wipe the teeth of the ratchet when it slips over in thus being drawn back. Upon the upward movement of the carriage $a$ the point of the pawl engages a shoulder in the ratchet-wheel, so that when the lever 32 swings under the action of the link 34 as the supplementary carriage rises the ratchet-wheel and feed-roller shaft with which it is connected are revolved a part of a revolution, thereby turning the upper feed-roller to feed the wire forward a given distance, the lower feed-roller turning with the upper one by friction, as in ordinary feed-rollers of this class. The cam G has three concentric peripheral faces, and when it is on the highest one of these faces the wire $b$ in the feed-rollers is elevated into a position in alignment with the spindle 38. The cam 61 is now engaged by a friction-roller 69, which is mounted upon the under side of the principal carriage 19, so as to force said carriage against the head 41 in the spindle 38, whereby said head turns off a portion of the rod to the proper size for the body of the screw. The cam 62 then engages said roller 69 and withdraws the stock from the head 41 of the spindle 38. The cam G then comes into position where the pin 36 of the vertical slide 21 rests upon the middle concentric face, so as to bring the rod $b$ in alignment with the thread-cutting spindle 39. The cam 63 now moves the carriage 19 and the rod into the threading-die, when one side of the friction-pulley 56 will be pressed against the conical pulley 57 of the spindle 38 to drive the spindle 39 in the proper direction to cut the thread. The cam 64 next engages the roller 69 to withdraw the carriage and rod, thereby pulling the friction-pulley 56 out of contact with the pulley 57 of the shaft 38 and bringing it into contact with the pulley 57 on the spindle 40, so as to revolve the spindle 39 in the opposite direction and unscrew the threading-die. The cam G moves on so that the pin 36 of the slide 21 rests upon the lowest concentric face of said cam, and the cam 65 on the cam-wheel E moves the carriage and rod again forward to present it to the head 43 of the spindle 40. The pin 54 on the sliding shaft 53 is engaged by the cam 58 to move the sliding tool-carriage 45 in a direction to carry the tool 47 against the work to turn the head of the screw. The cam 59 next engages the pin 54 and operates the shipper 52 to move the sliding cam 44 in the reverse direction, thereby moving the sliding tool-carriage 45 in the direction to withdraw the cutting-tool 47 and bring the cutting-off tool 48 into action to completely sever the screw thus turned and threaded from the rod. The cam 60 next operates the shipper to move the sliding tool-carriage 45 partly back again far enough, so that its point will be clear of the rod as it is again fed into the socket or bushing 46 for repeating the operations before described. Immediately after the screw has been thus cut off the pin 36 on the cam G is carried from the lowest to the highest of its peripheral concentric faces to again bring the wire in the supplementary carriage in alignment with the upper spindle for repeating the operations before described, the feed being operated to throw the stock forward during the upward movement of the slide 21.

In Fig. 18. I have shown a modification of the driving mechanism for the threading-spindle 39, which, in combination with the other spindles, I consider the equivalent of that first described. The spindle 39 is provided with a gear-wheel 71, which engages gear-wheels 72 on the spindles 38 and 40, said wheels being rigidly secured to loose sliding sleeves and beveled at their ends, so as to form friction-chucks 73 for engaging hollow conical faces on said spindles, that on the spindle 38 being formed in one side of the pulley 55 and that on the spindle 40 in one side of a rigid collar 74. The operation is substantially the same as that of the spindles before described. When the spindle 39 is pushed inwardly, it is revolved in a direction to cut the thread by means of the friction-clutch on the upper spindle 38, and when it is pulled out it is revolved in the reverse direction by means of the friction-clutch on the lower spindle 40.

I am aware that the stock has been held stationarily while a tool for operating thereon was revolved when only one operation was repeatedly performed on the rod or blank. My machine differs from such machines, because I hold a continuous rod or wire against rotation and present it successively to a series of revolving tools before cutting work therefrom into the desired length.

I claim as my invention—

1. The combination of a series of revolving spindles, devices for holding a continuous rod or wire against rotation, and a carriage upon which said devices are mounted for presenting said rod or wire successively to said spindles, substantially as described, and for the purpose specified.

2. The combination of a series of revolving spindles, devices for holding the work, a reciprocating slide or carriage upon which said devices are mounted, moving in the same plane as the axis of the several spindles, and a cam G, having concentric faces corresponding to the positions of said spindles for moving said slide and successively stopping it with the work in alignment with the respective spindles, substantially as described, and for the purpose specified.

3. The combination of a series of revolving spindles, a principal carriage 19, moving longitudinally to and from said spindles, a supplementary carriage having work-holding devices and mounted on said principal carriage to move transversely to said spindles, and mechanism for reciprocating said carriage, substantially as described, and for the purpose specified.

4. The combination of a series of revolving spindles, a principal carriage, a supplementary carriage reciprocating thereon, the cam-wheel for reciprocating said principal carriage, having cams corresponding to the respective spindles, and the cam for the supplementary carriage, having steps and concentric faces corresponding to the positions of said spindles, substantially as described, and for the purpose specified.

5. The combination of a reciprocating carriage, the feed-rollers mounted thereon, mechanism for reciprocating said carriage, the lever 32, having ratchet and pawl for moving the feed-rollers, and the link 34, pivotally secured to said lever and the bed of the machine, substantially as described, and for the purpose specified.

6. The combination of a series of revolving spindles and a reciprocating carriage moving transversely to said spindles with the straightening-rollers and feed mounted on said carriage, substantially as described, and for the purpose specified.

7. The combination of the spindles 38 40, the spindle 39, arranged between them and having a degree of longitudinal movement, a driving-wheel on said middle spindle, and frictional devices on opposite sides of said driving-wheel for connecting it with either spindle for revolving in different directions, substantially as described, and for the purpose specified.

8. The combination of the spindle 40, head 43, the tool-carriage 45, sliding transversely in said head, the cam 44, moving longitudinally in said head, and mechanism for operating said cam, substantially as described, and for the purpose specified.

9. The combination of the spindle 40, head 43, sliding tool-carriage 45, cam 44, having shipping-sleeve 51, the shipping-fork 52, shaft 53, having projection 54, and the cam-wheel F, substantially as described, and for the purpose specified.

10. The combination of a series of spindles, the head 43 on one of said spindles having sliding tool-carriage and cam, the shaft D, cam-wheel F, mechanism operatively connecting said cam-wheel and cam of the sliding tool-carriage in the head 43, the principal and supplemental carriages bearing work-holding devices, the cam-wheel E, and cam G, substantially as described, and for the purpose specified.

CHRISTOPHER M. SPENCER.

Witnesses:
ARTHUR H. EDDY,
ARTHUR D. NEWTON.